May 18, 1948.　　A. SIMMON ET AL　　2,441,675
PHOTOGRAPHIC SHUTTER
Filed March 17, 1945　　5 Sheets-Sheet 1

Fig:1

Alfred Simmon
Louis L. Weisglass
INVENTORS

BY Walter E. Wollheim
ATTORNEY.

May 18, 1948.　　A. SIMMON ET AL　　2,441,675
PHOTOGRAPHIC SHUTTER
Filed March 17, 1945　　5 Sheets-Sheet 2

Alfred Simmon
Louis L. Weisglass
INVENTORS

BY Walter S. Wallheim

ATTORNEY.

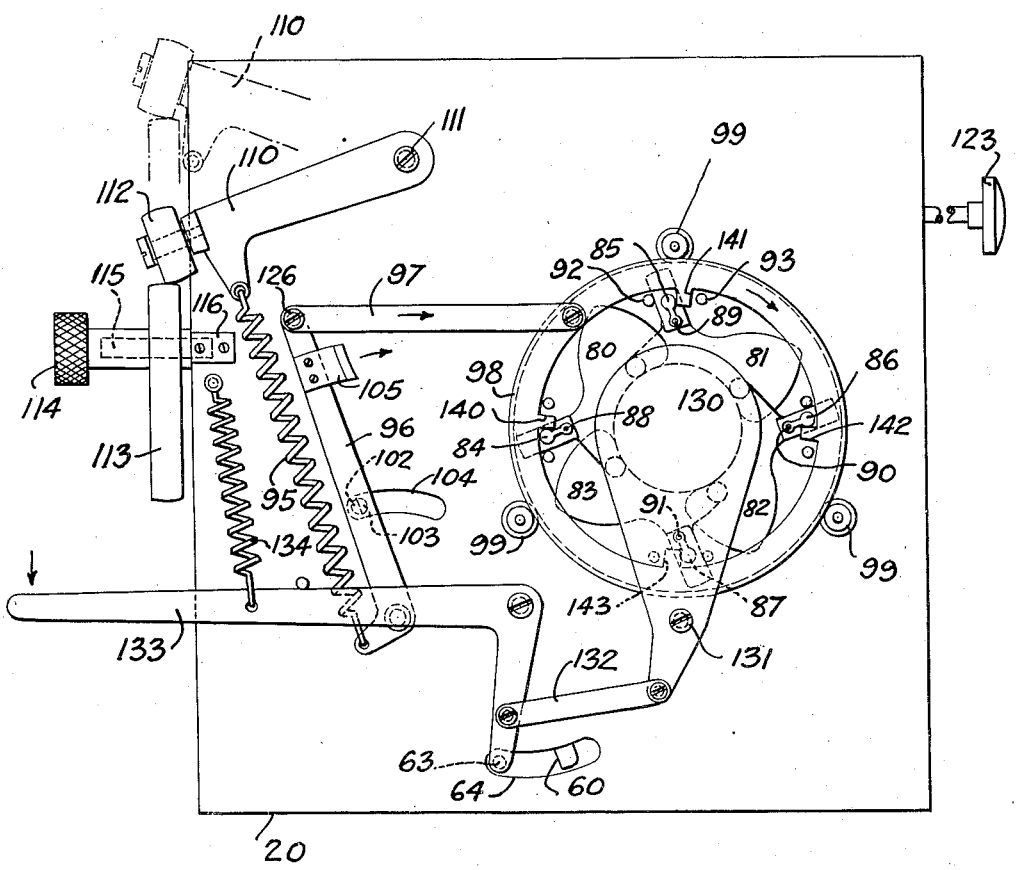

May 18, 1948.  A. SIMMON ET AL  2,441,675
PHOTOGRAPHIC SHUTTER
Filed March 17, 1945  5 Sheets-Sheet 4
Fig:4
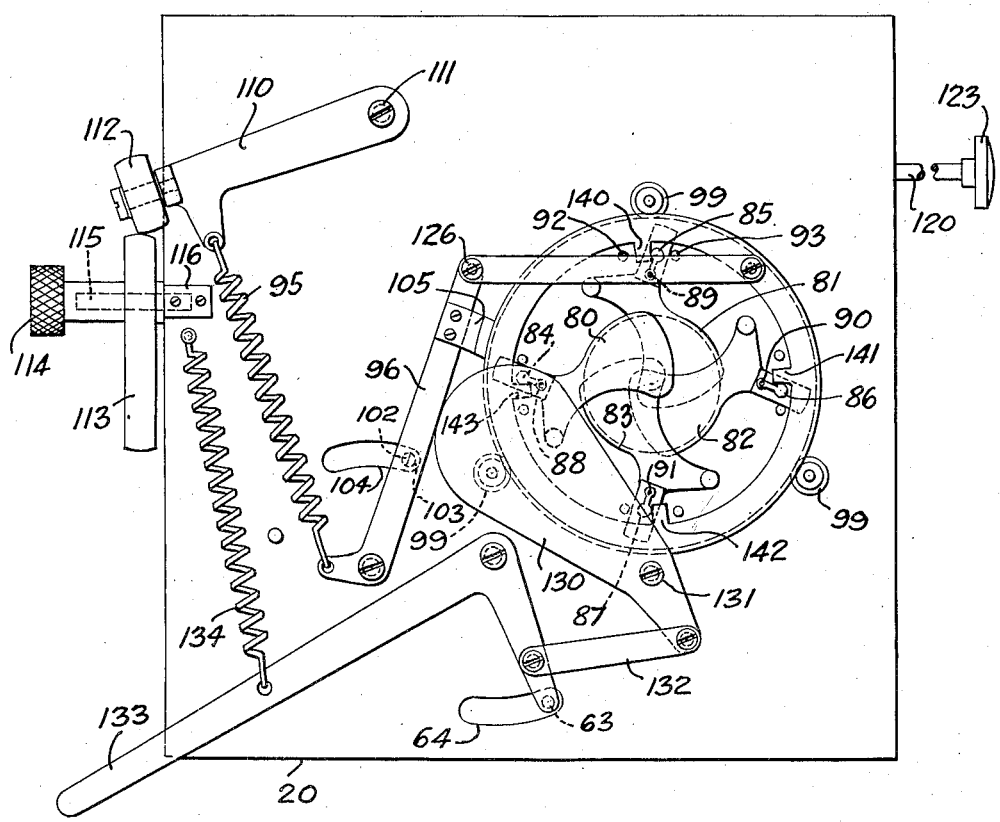
Alfred Simmon
Louis L. Weisglass
INVENTORS
BY Walter E. Wollheim
ATTORNEY.

May 18, 1948.  A. SIMMON ET AL  2,441,675
PHOTOGRAPHIC SHUTTER
Filed March 17, 1945   5 Sheets-Sheet 5
Fig:5
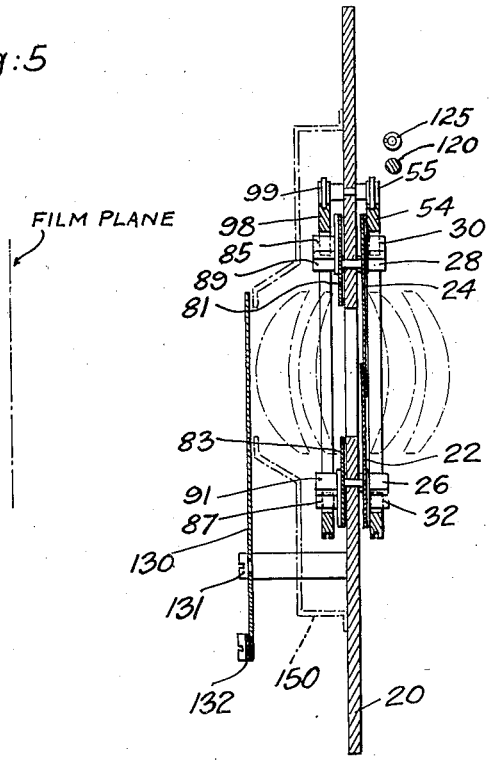
Fig:6
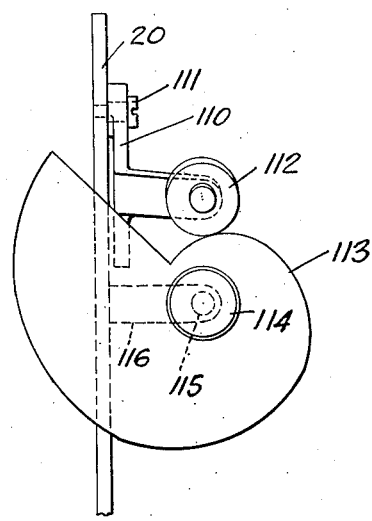
Fig:7
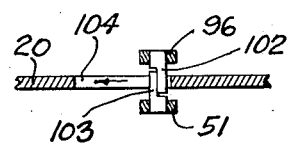
Alfred Simmon
Louis L. Weisglass
INVENTORS
BY Walter E. Wollheim
ATTORNEY.

Patented May 18, 1948

2,441,675

UNITED STATES PATENT OFFICE 2,441,675

PHOTOGRAPHIC SHUTTER

Alfred Simmon, Jackson Heights, and Louis L. Weisglass, New York, N. Y., assignors, by direct and mesne assignments, to Simmon Brothers, Inc., Long Island City, N. Y., a corporation of New York Application March 17, 1945, Serial No. 583,210

10 Claims. (Cl. 95—63)

The object of this invention is an improved photographic lens shutter, especially the kind which has its light admitting element arranged either between the elements of a photographic lens or immediately in front or behind this lens, as distinguished from a curtain or focal plane shutter, the light admitting element of which is arranged immediately in the front of the sensitized film, i. e., far away from the lens.

More particularly, this invention pertains to a type of shutter which employs two light controlling blade assemblies, one in front of the other, and of which one is adapted to be opened and the other is adapted to be closed during the exposure producing movement.

One of the novel features of this shutter is the use of two complete and separate motor units to actuate the two blade assemblies, respectively, each motor unit comprising a spring and a flywheel actuated by this spring, and of means to release these two motor units simultaneously. Heretofore, either one common spring actuated two cams which rotated in unison on a common shaft and which opened one and thereafter closed the other blade assembly, or, when two separate springs were employed, they were released one after the other by a common master element, or the movement of the first blade assembly after its release caused, after a certain time interval, the release of the motor unit of the second blade assembly.

One of our simultaneously released motor units opens one of the blade assemblies after a certain time delay, and the other motor unit closes the other blade assembly after another, but longer, time delay. The exposure is, of course, the difference between the two time delays.

The advantage of this scheme is that it enormously facilitates the timing control of the shutter, in particular in the range which is most commonly used, i. e., for exposure times of 1/100 of a second and faster. In the past it has been common practice to control the speed of photographic shutters by a retarding device which comprised either an air check or a train of gears. These retarding devices are quite inaccurate, especially for very short times, and it is, therefore, preferable to employ a scheme which permits the control of the exposure time by regulating the spring tension alone, since shutter speeds vary very accurately with the square root of the spring tension. A typical numerical example will illustrate this advantage:

Assuming that the longest exposure time to be controlled by the spring tension alone is 1/100 of a second or 10 milliseconds and the shortest exposure time 1/1000 of a second or 1 millisecond, an ordinary shutter would require a variation of the time interval during which it stays open in the proportion of 1:10, or the spring tension would have to be changed in the proportion of 1:100. This is manifestly impossible since the most that can be utilized is a variation of the spring tension of not more than 1:2. With a differential shutter as outlined above, we can make, for example, the initial time delay of the first motor unit 20 milliseconds and we then would have to vary the time delay of the second motor unit merely between 21 and 30 milliseconds in order to obtain exposure times from 1 to 10 milliseconds, the shortest exposure time then being 21−20=1 millisecond and longest exposure time 30−20=10 milliseconds. In other words, the time of the second motor element would have to be controlled only in the proportion of 30:21=1.42, or the spring tension would have to be varied in the proportion of $1:1.42^2=2$. This is just about within the limits of what is feasible. The time limit of 20 milliseconds was chosen because this is the average time delay of a photoflash lamp, and a time delay of this magnitude will facilitate the addition of a synchronizing flash contact should this become desirable.

The advantages obtained by this "differential" timing principle, i. e., by providing two separate, but simultaneously released motor units having different time constants or speeds, are so outstanding that we consider this the most important feature of our invention which is to cover this broad principle, not necessarily limited to a shutter as described which is merely a preferred embodiment of the invention.

Another novel feature of our invention is the construction of the two motor units. Each of these units comprises a flywheel in the form of a rotatably supported ring surrounding the shutter blades. This flywheel is equipped with internal projections adapted to actuate the pivoted shutter blades. A brake of novel design is incorporated in order to stop the motion of this flywheel without rebound.

Other novel features will become apparent in the following specification in which a typical shutter embodying the principles of the invention is described, illustrated in the accompanying drawings in which Fig. 1 is a front view of the shutter before exposure;

Fig. 3 is a rear view of the shutter before exposure;

Fig. 4 is a rear view of the shutter after an exposure, also with the release mechanism still depressed;

Fig. 5 is a cross-section along the line of plane 5—5 as indicated in Fig. 1, the lens elements and the film plane being shown diagrammatically in dotted lines;

Fig. 6 is a side view showing the timing cam in elevation; and

Fig. 7 shows the interlock between the two motor elements, i. e., a section along the line of plane 7—7 in Fig. 1.

Figure 1:
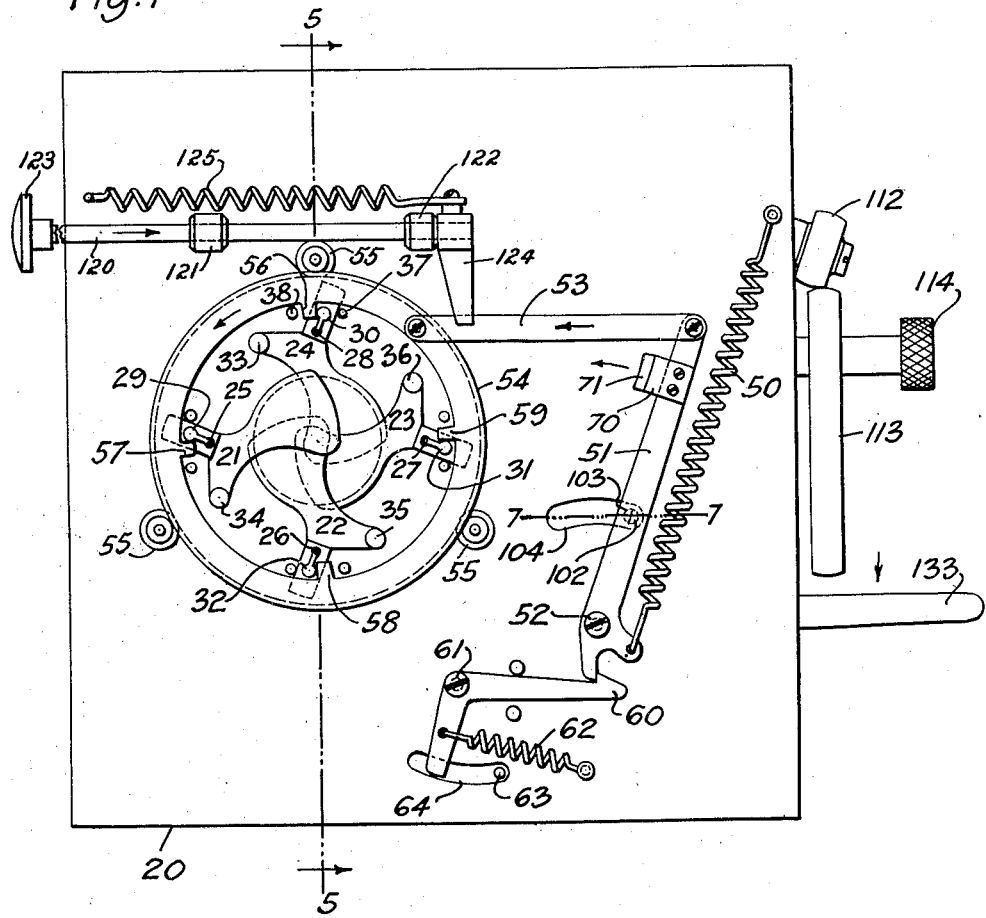

In the interest of clearness, only those parts of the shutter have been shown which are essential for the understanding of the principle of the invention. We have, therefore, omitted to show a housing, or means to mount the optical elements of the lens, or other parts of the camera which do not form part of this invention, since these elements are well known and since showing them in great detail would detract from the clarity of the description.

Like characters of reference denote similar parts throughout the several views and the following specification.

All shutter parts are mounted on a base plate 20 which is preferably manufactured from aluminum or magnesium or some other suitable light weight material. A normally closed shutter comprising a number of pivoted shutter blades and a motor unit to actuate these shutter blades is mounted in front of this base plate and a similar but normally open shutter comprising again a number of pivoted shutter blades and a motor unit to actuate them is mounted in the rear of said plate.

The shutter blades mounted in front of the base plate which are normally in closed position are 21, 22, 23 and 24 and they are mounted rotatably on pivots 25, 26, 27 and 28, respectively. Each shutter blade comprises a blade proper made from very thin sheet material, usually blue tempered spring steel of a thickness of .002" to .004". Fastened to each blade is a reinforcing piece 29, 30, 31 and 32, respectively. These reinforcing pieces are fastened to the blades by suitable means such as riveting or spot welding. The top view of these reinforcing pieces can be seen in Fig. 1 and their side view is visible in Fig. 5. For reasons which will become apparent later, it is desirable that the center of gravity of each blade coincide with the pivot, and, in order to accomplish that, small circular balancing weights are fastened to the blade at a suitable distance from the pivot. These balancing weights are called 33, 34, 35 and 36. The movement of each blade is restricted by suitable stops which are fastened to the base plate; for example, the movement of blade 24 is restricted by stops 37 and 38.

Attention is called to the fact that in this shutter we have dispensed with the conventional blade actuating ring which usually connects all blades of one set so that they can be opened or closed in unison. While it is true that a blade actuating ring of this character usually adds no more than about 15% to the momentum of inertia of the system, its elimination is, nevertheless, desirable since its movement is usually afflicted with a great deal of unpredictable friction.

The four blades 21, 22, 23 and 24 are actuated by a motor unit which comprises a spring, a lever actuated by this spring, a flywheel and a connecting rod connecting the flywheel with the above mentioned lever. In Fig. 1, is shown a spring 50 which actuates a lever 51 which is pivoted on a shaft 52. A connecting rod 53 connects lever 51 to flywheel 54. Flywheel 54 is rotatably supported by three small rollers 55. The flywheel consists of a ring with four internal projections 56, 57, 58 and 59. These internal projections come in contact with the reinforcing pieces of the shutter blades as will be explained later in detail.

The lever 51 is ordinarily restrained by a latch 60 which rotates on a pivot 61 and is biased by a spring 62 and actuated by a pin 63. Pin 63 is mounted on a release lever 133 which will be described later and which also actuates a safety cover 130 to the rear of the camera lens. A slot 64 is provided in the base plate permitting the movement of pin 63.

One of the most difficult problems in the design of high speed shutters is the prevention of oscillations or the prevention of a rebound of the motor element after it finishes its stroke. In this instance, it is accomplished by a brake which comprises a brake shoe 70 mounted on lever 51. This brake shoe has a lining 71, is preferably manufactured from a compressible material, which, however, must have the property to recover its original shape slowly after the pressure has been removed. Such materials, are, for example, cork or leather. After the release of latch 60, lever 51 will rotate around pivot 52 until the brake shoe 70 comes in contact with the flywheel 54. If these parts are properly proportioned, this brake will eliminate any rebound of the motor unit. The position of all parts just described, after the exposure has taken place, can be seen in Fig. 2. The release lever and the associated pin 63 as well as the latch 60 are still shown in the depressed position.

A substantially identical shutter is mounted on the rear of base plate 20 and is shown in Fig. 3. We have again four pivoted shutter blades 80, 81, 82 and 83 with reinforcing pieces 84, 85, 86 and 87. These blades rotate on pivots 88, 89, 90 and 91, respectively, and their movement is again restricted by stop pins. For example, the movement of blade 81 is restricted by stop pins 92 and 93. These blades are normally open and are closed during the exposure producing movement of the motor unit, as distinguished from the corresponding blades 21, 22, 23 and 24 of the front shutter which are normally closed and opened during the exposure producing movement of the motor unit. The motor unit is very similar to the one of the first described or front shutter and consists of a spring 95 and a lever 96, a connecting rod 97, and a flywheel 98. Flywheel 98 is rotatably supported by three small rollers 99, and is again equipped with internal projections 140, 141, 142 and 143 in exactly the same manner as the corresponding flywheel 54 of the front shutter. The lever 96 is restrained not by a latch as the corresponding lever 51 of the front shutter, but by a pin 102 which cooperates wth a similar pin 103 which is fastened to the lever 51 of the front shutter. A slot 104 is provided in the base plate 20 permitting the two pins 102 and 103 to come in contact. The function of these pins which, in effect, interlock the two shutters can be clearly seen in Fig. 7 which is a cross-section along the plane of line 7—7 as indicated in Fig. 1. By means of these pins, the rear shutter is released at the same time as the front shutter.

A brake shoe 105 is mounted on lever 96. This brake shoe comes in contact with flywheel 98 after the exposure and stops motion of the motor unit without rebound.

In order to control the timing of the shutter the spring tension of the rear shutter can be varied under the control of the operator. One end of spring 95 is fastened to lever 96, as described before, and the other end is fastened to a lever 110 which can rotate on the pivot 111. The other end of lever 110 is equipped with a roller 112 which is in contact with a spiral shaped cam 113. This spiral shaped cam can be rotated by means of a knurled knob 114. This cam assembly may be rotatably supported in any convenient manner and we have shown a shaft 115 and a supporting block 116. All parts associated with this cam can be best seen in Fig. 6. In Fig. 3 the spring assembly is shown at the position of the smallest spring tension in solid lines and the position of lever 110 at the position of highest spring tension is shown in dotted lines.

Figure 2:
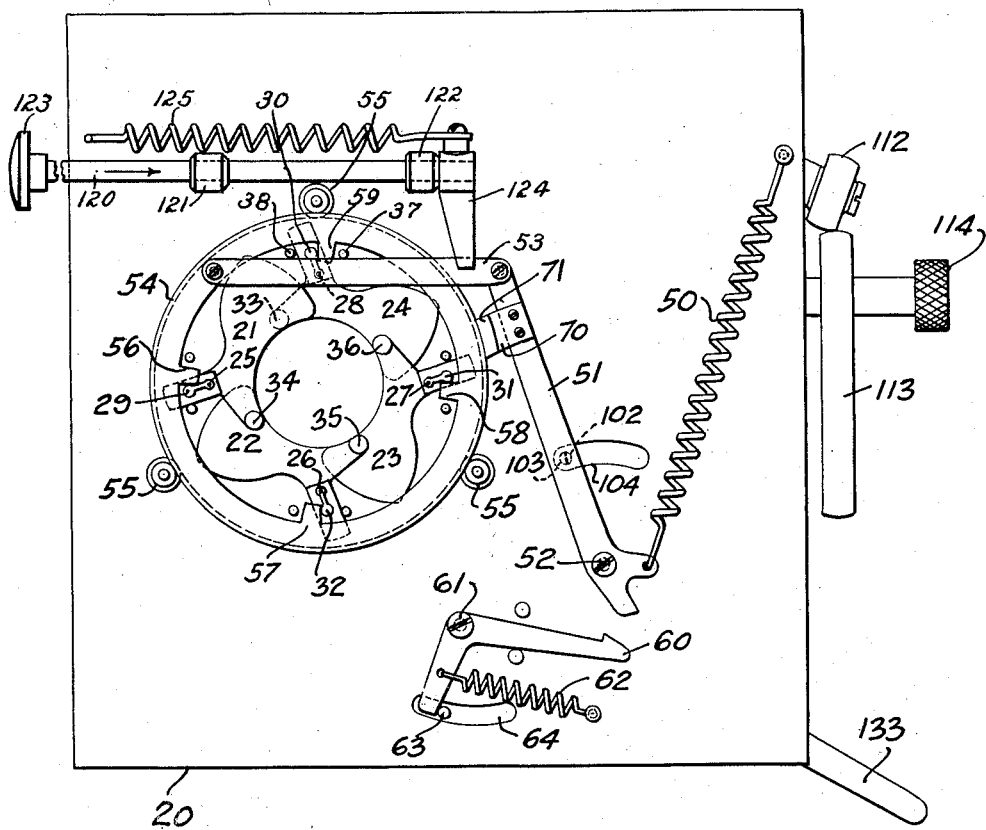
Fig. 2 is a front view of the shutter after an exposure, the release mechanism being shown as still in the depressed position.

Resetting of the shutter after an exposure can be accomplished simply by pushing lever 51 from the position shown in Fig. 2 back into the position shown in Fig. 1. This will not only reset the front shutter, but due to the interlocking pins 102 and 103, will also reset lever 96 and therewith the rear shutter. The return of lever 51 into its original position can be done in many ways and we are showing merely one which is typical. We have a rod 120 which slides in two bearings 121 and 122. On one end of this rod 120 is a button 123 and on the other end a piece 124. The entire assembly is biased by a spring 125 and ordinarily held in the position shown in Fig. 1 in solid lines. After the exposure the operator pushes button 123 in the direction of the arrow, i. e., towards the right, so that piece 124 occupies the position 124' shown in Fig. 1 in dotted lines. Piece 124 comes in contact with the head of the shoulder screw 126 which connects the connecting rod 53 to the lever 51 and it will be clear that, if button 123 is pushed towards the right, lever 51 is restored from the position shown in Fig. 2 to the original position of Fig. 1. While this movement is perfectly satisfactory, it can in practice be modified in many ways and it may in particular be desirable to actuate this resetting device not manually, but for example, by a cam or the like which is synchronized with the film advancing means of the camera. Devices of this type are well known in the art and are, therefore, not shown here.

A difficulty arises during the resetting of the shutter because the rear shutter is reset from a closed to an open position at the same time during which the front shutter is reset from an open to a closed position so that for a short time the shutter again will admit light into the camera. On shutters of this type, i. e., on shutters which have a first normally closed blade assembly which is opened during the exposure producing movement and a second normally open blade assembly which is closed during the exposure producing movement, very ingenious means have been suggested to prevent this second exposure during resetting. These means usually comprise interlocks which assure the reclosing of the normally closed front shutter before the reopening of the normally open rear shutter. However, these devices are not applicable in this instance due to the interlock between levers 96 and 51. This interlock, however, cannot be dispensed with since the simultaneous release of both shutters could otherwise not be accomplished.

To overcome this difficulty, we resort to a safety cover behind the lens which is directly connected to the release lever. This safety cover can be seen in Figs. 3 and 4 and also in Fig. 5. It consists essentially of a pivoted cover blade 130 which swivels around a pivot 131 and which is connected by means of a connecting rod 132 to the release lever 133. This release lever is biased by a spring 134 and also carries pin 63 which was mentioned above and which is adapted to come in contact through slot 64 with latch 60 of the front shutter assembly. A baffle 150 is arranged between the base plate 20 and the safety cover blade 130. The purpose of this baffle is to exclude any side light which may pass the lens and by reflection work its way around the safety cover into the interior of the camera. This baffle is shown in dotted lines in Fig. 5.

Fig. 4 shows all parts of the rear shutter in the position which they occupy immediately after an exposure, while release lever 133 with the associated safety cover 130 and with latch 60 of the front shutter is still being depressed by the operator.

From this description the working function of the shutter and the coaction of the various parts can be fully understood. Let us assume that we start with a shutter which has been reset, i. e., spring 50 of the front shutter as well as spring 95 of the rear shutter are under tension or, in other words, the front shutter is in the position shown in Fig. 1 and the rear shutter is in the position shown in Fig. 3. To initiate an exposure, the operator depresses release lever 133. The movement of this lever is transmitted through connecting rod 132 to the safety cover 130 which rotates around pivot 131 in a clockwise direction thereby uncovering the aperture in the center of the base plate 20 which, however, is as yet closed by the blades of the front shutter. Almost at the end of its stroke, i. e., when the safety cover is almost in the position shown in Fig. 4, pin 63 which is associated with release lever 133 comes in contact through slot 64 of the base plate with the latch 60 of the front shutter, thereby moving it from the position shown in Fig. 1 into the position shown in Fig. 2. This, in turn, releases spring biased lever 51 of the front shutter which now moves towards the left as shown in Fig. 1, and it also permits lever 96 of the rear shutter to start its movement since now pin 102 which is mounted to lever 96 is no longer restrained by pin 103 which is mounted on lever 51, see Fig. 7. The spring tension of spring 95 of the rear shutter is always less than the tension of spring 50 of the front shutter, this degree of lesser tension depending upon the position of lever 110 as controlled by cam 113. Consequently, lever 96 will move with less speed than lever 51 and a gap of increasing width will appear between pins 103 and 102 during the movement of both levers. The faster moving lever 51 will come to a stop first, when brake 70 hits flywheel 54. This position is shown in Fig. 2. At this time lever 96 of the rear shutter has not yet completed its stroke and it will continue to move for a short period of time until, in turn, its brake shoe 105 comes in contact with flywheel 98 whereupon the rear shutter will also come to a standstill.

With reference to Fig. 1, before the exposure each blade is held securely between one stop pin on one side and one of the internal projections of the flywheel on the other side. For example, the reinforcing piece 30 of blade 24 is restricted on one side by stop pin 37 and on the other side by projection 56 of flywheel 54. All other blades of this assembly are similarly locked as shown in Fig. 1. In an identical manner the blades of the normally open rear shutter are locked in open position, for example, the reinforcing piece 85 of blade 81 is confined on one side by stop pin 92 and on the other side by internal projection 141 of flywheel 98, Fig. 3.

Upon release of lever 51, flywheel 54 begins to rotate in a counter-clockwise position whereupon its internal projections lose contact with the corresponding reinforcing pieces of the four shutter blades. The four blades will then, for a certain interval of time, not be restricted in their rotary movement by contact with any of the other shutter parts. They are prevented from performing movements of their own merely by the fact that the center of gravity coincides with the pivot, the blades being balanced by means of the small counterweights 33 as explained above. Obviously, if the center of gravity of each blade coincides with the pivot there will be no tendency of the blade to rotate in one direction or the other. This tendency of the blades to remain in their position will be somewhat augmented by the small amount of friction which is always present in any bearing.

After the flywheel has rotated substantially 90°, each of the four projections again makes contact with one of the four blades, but not with the same one it was in contact with before the exposure. For example, the projection 56 which was in contact with reinforcing piece 30 of blade 24 now comes in contact with reinforcing piece 29 of blade 21. Since the momentum of inertia of the flywheel is many times as large as the momentum of inertia of the four blades, it is only slowed down slightly by contact with the blades. It continues its travel for another small angle, approximately 10°, thereby opening all four blades in unison, i. e., shifting them from the position in Fig. 1 to the position in Fig. 2. It can be seen that now, for example, blade 21, or more particularly, its reinforcing piece 29 is held securely in its open position between projection 56 of the flywheel and stop pin 40.

Exactly in the same manner the normally open blades of the rear shutter are closed at the end of the rotary movement of the rear flywheel 98. With reference to Fig. 3, after the release of lever 96, flywheel 98 travels in a clockwise direction, when looking at the rear of the shutter, until after a travel of approximately 90°, for example, the internal projection 141, which in Fig. 3 holds blade 81 open, comes in contact with reinforcing piece 86 of blade 82 and closes it. All other blades of that rear shutter are similarly locked after the exposure between their respective stop pins and the internal projections of flywheel 98, as shown in Fig. 4.

After the exposure, the operator relinquishes its hold on release lever 133 which, biased by spring 34, now returns into its original position shown in Fig. 3. This, in turn, causes safety cover 130 to return into its position immediately behind the lens, thereby blocking any light tending to pass the shutter aperture.

Due to the presence of this safety cover behind the lens, the front as well as the rear shutter can now be reset simultaneously by pushing button 123 towards the left, Fig. 3. This moves rod 120 with the associated piece 124 to the left, thereby resetting lever 96 and, through the action of interlock pins 102 and 103, also resetting lever 51 until it snaps into the original position of Fig. 1 where it is restrained again by latch 60. During this movement the rear shutter will open again and the front shutter will close again and these two movements will take place at the same time so that for a short period of time light could pass the shutter if it were not for the presence of the safety cover 130 which is provided precisely for the purpose of preventing this.

It is understood that various changes in form, proportions and minor details of construction may be resorted to without departing from the principles or sacrificing any of the advantages of the invention as defined in the appended claims.

What we claim as new, is:

1. A photographic shutter comprising a supporting structure, a normally closed blade assembly including a plurality of pivoted blades, a normally open blade assembly including a plurality of pivoted blades, a motor unit for each assembly, each unit including a flywheel, a spring adapted to drive said flywheel, means to tension said spring, and means to hold said spring releasably under tension, means to release the springs of both said motor units simultaneously, means in one of said units adapted, upon release of its spring, to open after a predetermined time lag said normally closed assembly, means in the other of said units adapted, upon release of its spring, to close after another predetermined but longer time lag said normally open assembly, and means to adjust the time lag of at least one of said motor units.

2. A photographic shutter comprising a supporting structure with a light admitting aperture, a normally closed blade assembly including a plurality of pivoted blades, a normally open blade assembly including a plurality of pivoted blades, a motor unit for each assembly, each unit including a flywheel consisting of a rotatably supported ring having internal projections, said ring being concentric with said aperture and surrounding the shutter blades, each of said projections adapted to actuate one of said blades, a spring adapted to drive said flywheel, means to tension said spring, and means to hold said spring releasably under tension, means to release the springs of both said motor units simultaneously, means in one of said units adapted, upon release of its spring, to open after a predetermined time lag said normally closed assembly, means in the other of said units adapted, upon release of its spring, to close after another predetermined but longer time lag said normally open assembly, and means to adjust the time lag of at least one of said motor units.

3. A photographic shutter comprising a supporting structure with a light admitting aperture, a normally closed blade assembly including a plurality of pivoted blades, a normally open blade assembly including a plurality of pivoted blades, each blade in both said assemblies being balanced so that its center of gravity coincides with its pivot point, a motor unit for each assembly, each unit including a flywheel consisting of a rotatably supported ring having internal projections, said ring being concentric with said aperture and surrounding the shutter blades, each of said projections adapted to actuate one of said blades, a spring adapted to drive said flywheel, means to tension said spring, and means to hold said spring releasably under tension, means to release the springs of both said motor units simultaneously, means in one of said units adapted, upon release of its spring, to open after a predetermined time lag said normally closed assembly, means in the other of said units adapted, upon release of its spring, to close after another predetermined but longer time lag said normally open assembly, and means to adjust the time lag of at least one of said motor units.

4. A photographic shutter comprising a supporting structure, a normally closed blade assembly including a plurality of pivoted blades, a normally open blade assembly including a plurality of pivoted blades, a motor unit for each assembly, each unit including a flywheel, a lever, a connecting rod between said lever and flywheel, a spring adapted to drive said lever, means to tension said spring, means to hold said spring releasably under tension, means to release the springs of both said motor units simultaneously, means in one of said units adapted, upon release of its spring, to open after a predetermined time lag said normally closed assembly, means in the other of said units adapted, upon release of its spring, to close after another predetermined but longer time lag said normally open assembly, and means to adjust the time lag of at least one of said motor units.

5. A photographic shutter comprising a supporting structure, a normally closed blade assembly including a plurality of pivoted blades, a normally open blade assembly including a plurality of pivoted blades, a motor unit for each assembly, each unit including a rotatably supported flywheel, a lever, a connecting rod between said lever and flywheel, a spring adapted to drive said lever, means to tension said spring, means to hold said spring releasably under tension, means to release the springs of both said motor units simultaneously, a brake shoe mounted on said lever adapted to contact the periphery of said flywheel at the end of movement of the motor unit to stop its motion without rebound, means in one of said units adapted, upon release of its spring, to open after a predetermined time lag said normally closed assembly, means in the other of said units adapted, upon release of its spring, to close after another predetermined but longer time lag said normally open assembly, and means to adjust the time lag of at least one of said motor units.

6. A photographic shutter comprising a supporting structure, a normally closed blade assembly including a plurality of pivoted blades, a normally open blade assembly including a plurality of pivoted blades, a motor unit for each assembly, each unit having moving elements including a flywheel, a spring adapted to drive said flywheel, means to tension said spring, and means to hold said spring releasably under tension, means to release both said motor units simultaneously, means in one of said units adapted, upon release of its spring, to open after a predetermined time lag said normally closed assembly, means in the other of said units adapted, upon release of its spring, to close after another predetermined but longer time lag said normally open assembly, and means to adjust the time lag of at least one of said motor units, said means to release both motor units simultaneously comprising a latch restraining one of the elements of one unit and a projection on one of the elements of the same unit restraining a corresponding element of said other unit.

7. A photographic shutter comprising a supporting structure, a normally closed blade assembly including a plurality of pivoted blades, a normally open blade assembly including a plurality of pivoted blades, a motor unit for each assembly, each unit including a rotatably supported flywheel, a lever, a connecting rod between said lever and flywheel, a spring adapted to drive said lever, means to tension said spring, and means to hold said spring releasably under tension, means to release both said motor units simultaneously, means in one of said units adapted, upon release of its spring, to open after a predetermined time lag said normally closed assembly, means in the other of said units adapted, upon release of its spring, to close after another predetermined but longer time lag said normally open assembly, and means to adjust the time lag of at least one of said motor units, said means to release both motor units simultaneously comprising a latch restraining the lever of one of the units and a projection on said lever restraining the lever of said other unit.

8. A photographic shutter comprising a supporting structure, a normally closed blade assembly including a plurality of pivoted blades, a normally open blade assembly including a plurality of pivoted blades, a motor unit for each assembly, each unit including a flywheel, a spring adapted to drive said flywheel, means to tension said spring, and means to hold said spring releasably under tension, means to release the springs of both said motor units simultaneously, means in one of said units adapted, upon release of its spring, to open after a predetermined time lag said normally closed assembly, means in the other of said units adapted, upon release of its spring, to close after another predetermined but longer time lag said normally open assembly, and means to adjust the time lag of said other unit by varying the tension of its spring, while the spring tension of the first mentioned unit is being kept constant.

9. A photographic shutter comprising a supporting structure, a normally closed blade assembly including a plurality of pivoted blades, a normally open blade assembly including a plurality of pivoted blades, a motor unit for each assembly, each unit including a rotatably supported flywheel, a lever, a connecting rod between said lever and flywheel, a spring adapted to drive said lever, means to tension said spring, means to hold said spring releasably under tension, and a brake shoe mounted on said lever adapted to contact said flywheel at the end of the movement of the motor unit to stop its motion without rebound, means to release both said motor units simultaneously, means in one of said units adapted, upon release of its spring, to open after a predetermined time lag said normally closed assembly, means in the other of said units adapted, upon release of its spring, to close after another predetermined but longer time lag said normally open assembly, and means to adjust the time lag of at least one of said motor units, said means to release both motor units simultaneously comprising a latch restraining the lever of one of the units and a projection on said lever restraining the lever of said other unit.

10. A photographic shutter comprising a supporting structure with a light admitting aperture, a normally closed blade assembly including a plurality of pivoted blades, a normally open blade assembly including a plurality of pivoted blades, a motor unit for each assembly, each unit including a flywheel consisting of a rotatably supported ring having internal projections, said ring being concentric with said aperture and surrounding the shutter blades, each of said projections adapted to actuate one of said blades, a lever, a connecting rod between said lever and flywheel, a spring adapted to drive said lever, means to tension said spring, means to hold said spring releasably under tension, means to release the springs of both said motor units simultaneously, a brake shoe mounted on each of the levers of both motor units adapted to contact said flywheel at the end of the movements of both motor units to stop their motion without rebound, means in one of said units adapted, upon release of its spring, to open after a predetermined time lag said normally closed assembly, means in the other of said units adapted, upon release of its spring, to close after another predetermined but longer time lag said normally open assembly, and means to adjust the time lag of at least one of said motor units.

ALFRED SIMMON.
LOUIS L. WEISGLASS.

REFERENCES CITED

The following references are of record in the file of this patent:

UNITED STATES PATENTS

| Number | Name | Date |
|---|---|---|
| 1,274,262 | Gruss | July 30, 1918 |
| 1,377,366 | Rose | May 10, 1921 |
| 1,483,465 | Marks | Feb. 12, 1924 |
| 2,168,893 | Aiken | Aug. 8, 1939 |
| 2,231,094 | Seifert | Feb. 11, 1941 |
| 2,232,969 | Ranft | Feb. 25, 1941 |
| 2,326,077 | Steiner | Aug. 3, 1943 |
| 2,354,168 | Aiken | July 18, 1944 |
| 2,367,526 | Riddell | Jan. 16, 1945 |
| 2,398,409 | Carroll | Apr. 16, 1946 |